United States Patent
Wu

(10) Patent No.: US 6,369,325 B1
(45) Date of Patent: Apr. 9, 2002

(54) SWITCH BOX FOR A CEILING FAN

(76) Inventor: Chung-Ching Wu, No. 164-4, Alley 9, Lane 287, Sec. 3, Jungshan Rd., Tantz Shiang, Taichung (TW), 427

( * ) Notice: Subject to any disclaimer, the term of this patent is extended or adjusted under 35 U.S.C. 154(b) by 0 days.

(21) Appl. No.: 09/715,160

(22) Filed: Nov. 20, 2000

(51) Int. Cl.⁷ .......................... H02G 3/08; H01R 13/66
(52) U.S. Cl. ..................... 174/52.1; 174/50; 439/537
(58) Field of Search ..................... 174/50, 52.1, 58, 174/59, 60, 61, 62; 361/807, 809, 810, 811; 248/205.3, 906; 220/3.2, 3.3, 3.8, 3.9; 439/537

(56) References Cited

U.S. PATENT DOCUMENTS

| | | | | |
|---|---|---|---|---|
| 4,637,673 A | * | 1/1987 | Yang | 339/89 M |
| 4,721,480 A | * | 1/1988 | Yung | 439/527 |
| 5,508,484 A | * | 4/1996 | Chen | 200/302.1 |
| 6,238,239 B1 | * | 5/2001 | Wu | 439/537 |

FOREIGN PATENT DOCUMENTS

GB 2259191 * 3/1993

* cited by examiner

Primary Examiner—Dean A. Reichard
Assistant Examiner—Carmelo Oliva
(74) Attorney, Agent, or Firm—Rosenberg, Klein & Lee

(57) ABSTRACT

A switch box for a ceiling fan includes a base and a cover between which the control members are received. The base has two openings and two insertions extend from two sides defining each openings so that the insertions are engaged with grooves of some of the control members. The rest of the control members fixedly connected to the cover by bolt and the control members on the cover has flanges which are engaged with groove defined in the control members in the base. The engagement of the flanges and the grooves of the control members makes the assembly of the switch box simpler and easier.

4 Claims, 3 Drawing Sheets

SWITCH BOX FOR A CEILING FAN

FIELD OF THE INVENTION

The present invention relates to a switch box for a ceiling fan and includes a cover with three control members connected to an inside thereof, and a base with the other three control members connected therein. The control members are connected with each other by engagement of flanges and grooves.

BACKGROUND OF THE INVENTION

A conventional switch box generally is connected to a lower end of a motor case of a ceiling fan and a lot of control members are respectively received in the switch box. Each control member controls specific functions such as hand-operation function, remote-control function, power on or off function, and direction of the fan. Each control member has at least two wires, and these wires of the control members must properly separated and fixed. Therefore, a complicated arrangement is in the switch box. Furthermore, the positioning of each control member is a major problem when assembling the switch box because the switch box has only a limited space in which so many control members and wires are gathered so that it takes a lot of time to assemble the switch box.

The present invention intends to provide a switch box wherein each control member has flanges and grooves so that they can be easily connected with each other neatly.

SUMMARY OF THE INVENTION

In accordance with one aspect of the present invention, there is provided a switch box for a ceiling fan and comprising a base having a base board with a peripheral wall. Two openings are defined in the peripheral wall and two insertions extend from two sides defining each opening. A first control member has two grooves defined in a first end thereof and the insertions of one of the two openings are engaged with the grooves. Two flanges extend from a second end of the first control member. A second control member has two grooves defined in a first end thereof and the insertions of the other opening are engaged with the grooves. Two flanges extend from a second end of the second control member. A cover is engaged with the peripheral wall of the base and a hole is defined through the cover. A control assembly is connected to the cover and two ends of the control assembly have grooves which are respectively engaged with the flanges of the second end of the first control member and the flanges on the second end of the second control member.

The primary object of the present invention is to provide a switch box for a ceiling fan wherein the control members in the box have modular casings so as to easily connect with each other.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
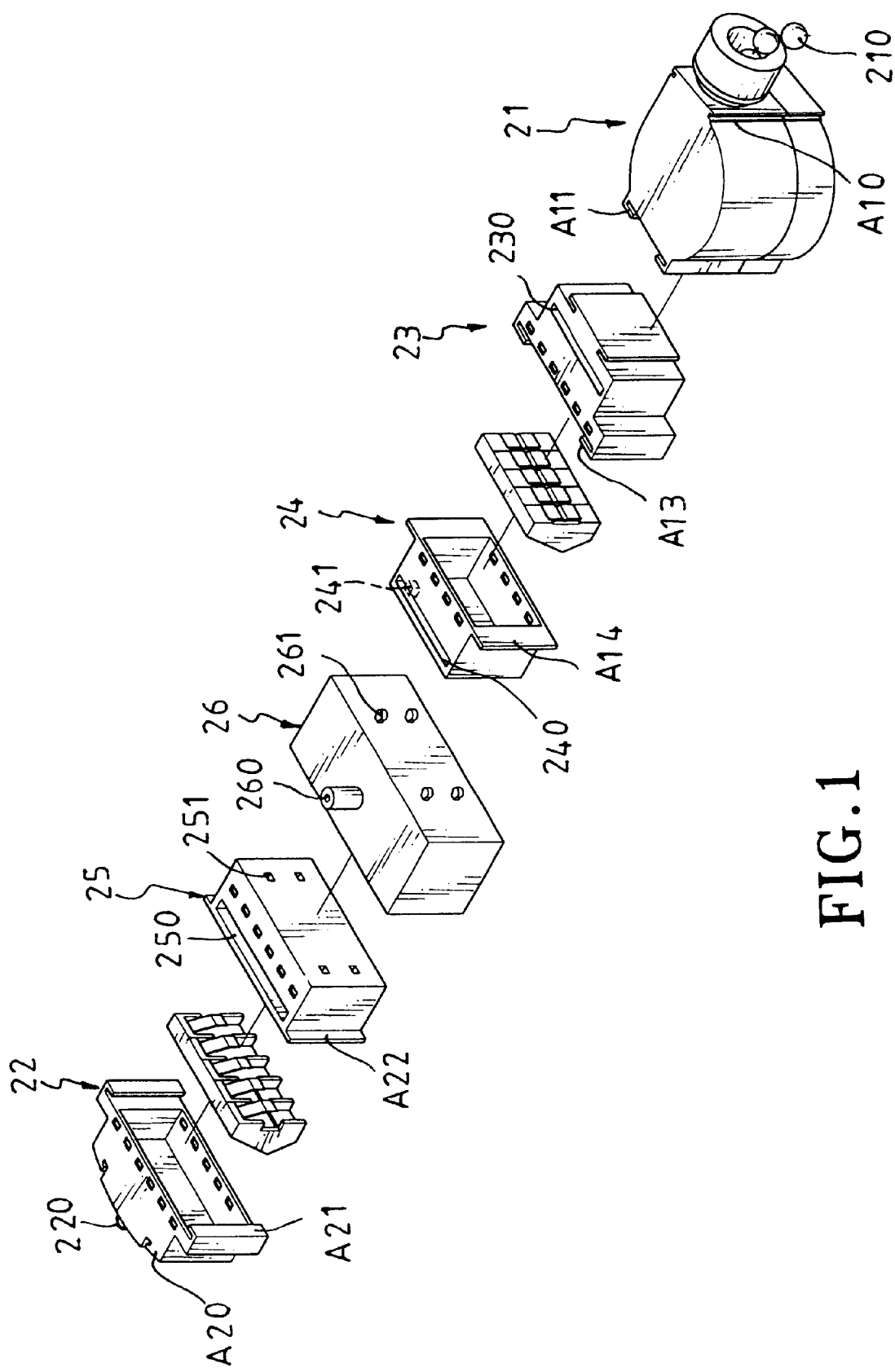
FIG. 1 is an exploded view to show the control members in a switch box of the present invention.
Figure 2:
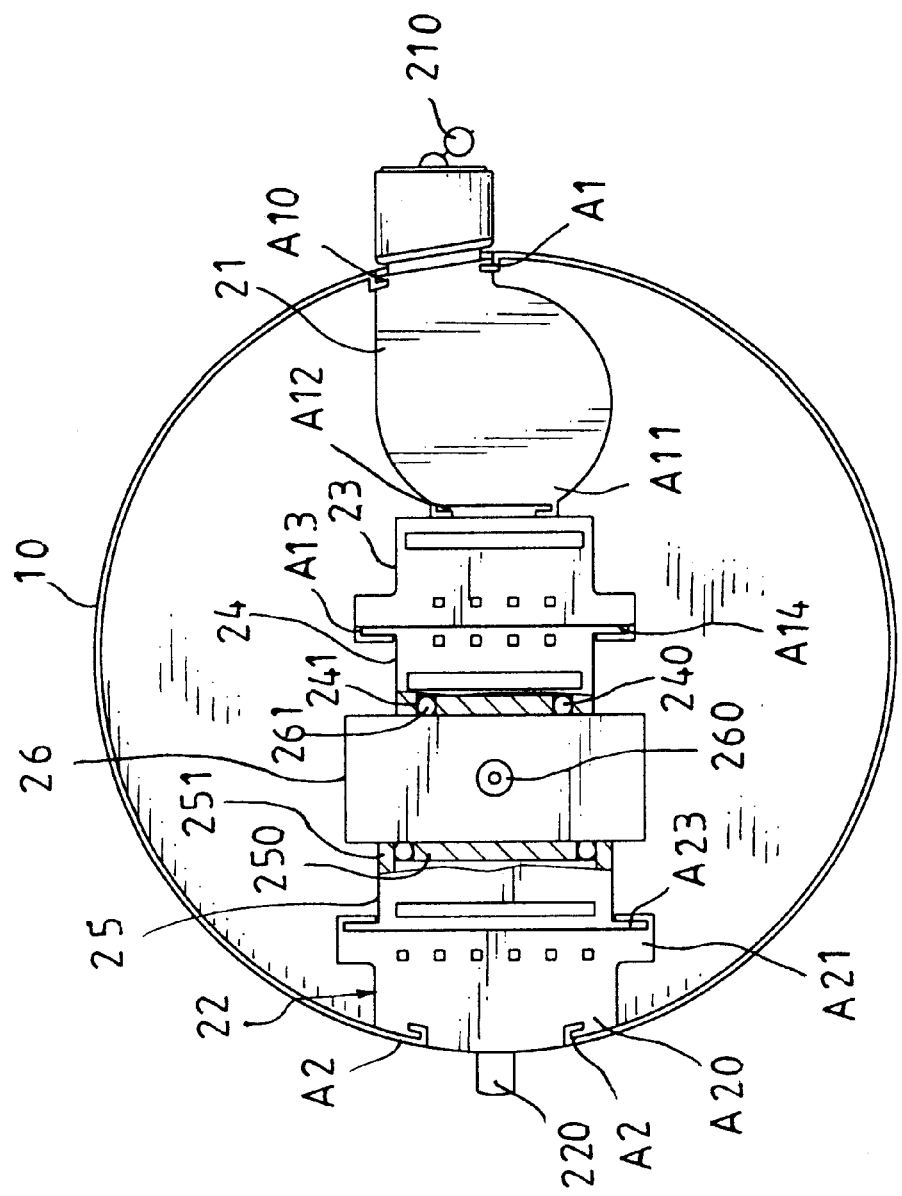
FIG. 2 is an illustrative view to show the connection of the control members and the switch box of the present invention.
Figure 3:
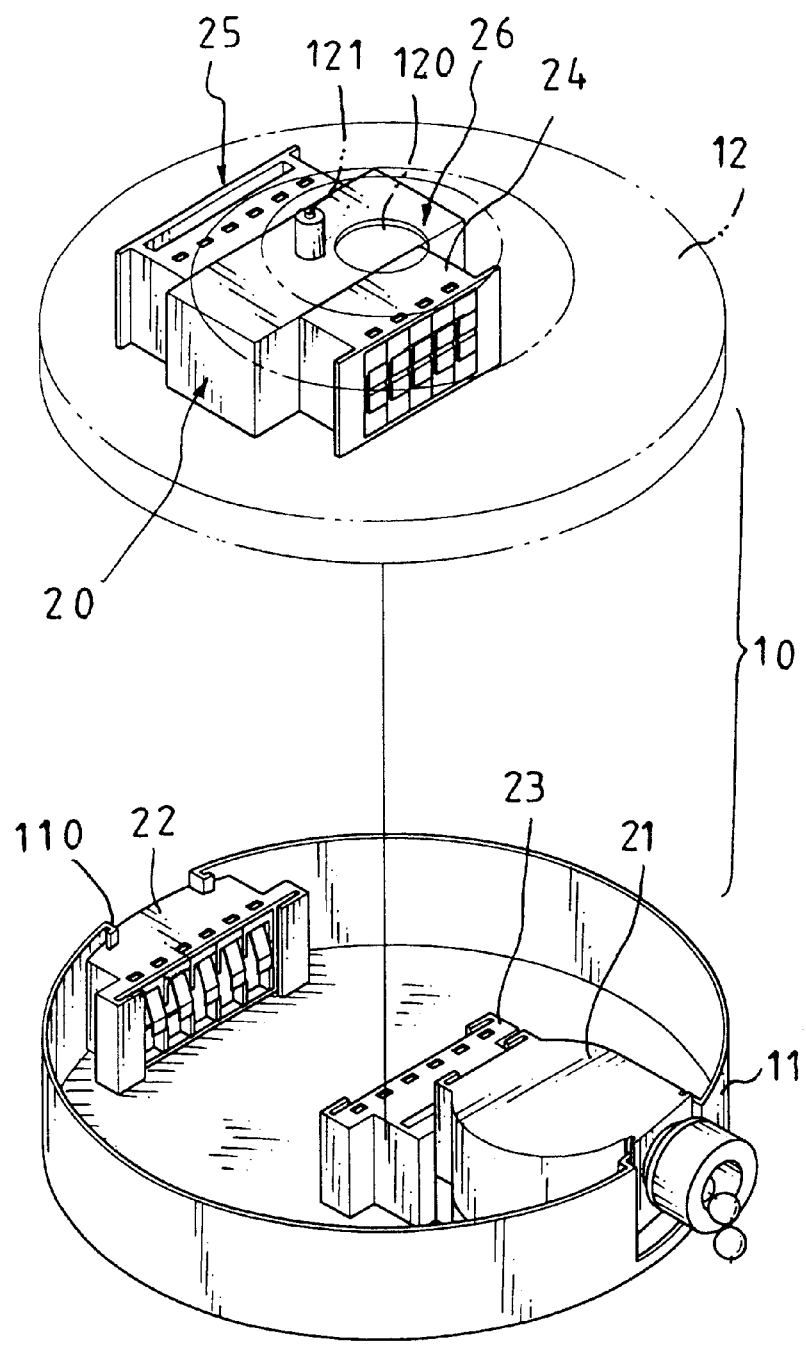
FIG. 3 is an exploded view to show a base and a cover of the switch box of present invention.

Referring to FIGS. 1 to 3, the switch box 10 for a ceiling fan comprises a base and a cover 12. The base has a base board with a peripheral wall 11 extending from the base board. Two openings are defined diametrically in opposite in the peripheral wall 11 and two insertions 110 extend from two sides defining each opening.

A first control member 21 being a hand-operation control member has two grooves A10 defined in a first end thereof and the insertions 110 of one of the two openings are engaged with the grooves A10. The first end of the first control member 21 extends from the opening and has a chain of beads 210 movably extends therefrom so that a user may pull the chain of beads 210 to turn on the ceiling fan. Two flanges A11 extend from a second end of the first control member 21. A wire connection member 23 has two grooves A12 on a first end thereof so as to be engaged with the flanges A11 of the first control member 21. Two grooves A13 are defined in a second end of the wire connection member 23. A slot 230 is defined in a top of the wire connection member 23 so as to receive wires from the first control member 21. A second control member 22 is a direction control member and has two grooves A20 defined in a first end thereof and the insertions 110 of the other opening are engaged with the grooves A20. Two grooves A21 defined in a second end of the second control member 21 and a switch lever 220 extends from the first end of the second control member 22.

The cover 12 is engaged with the peripheral wall 11 of the base and a hole 120 is defined through the cover 12 for wires of a control assembly 20 extend therefrom. The control assembly 20 includes an adapter 26, a power control member 24 connected to an end of the adapter 26 and a direction control member 25 connected to the other end of the adapter 26. A position tube 260 extends from the adapter 26 and a bolt 121 extends through the cover 12 and is engaged with the position tube 260 to connect the adapter 26 to the cover 12. A plurality of protrusions 261 extend from each of two ends of the adapter 26, and each of the power control member 24 and the direction control member 25 has recesses 241/251 defined therein so as to engage with the protrusions 261 such that the three members are connected with each other. Each of the power control member 24 and the direction control member 25 has flanges A14/A22 which are respectively engaged with the grooves A13 in the second end of the wire connection member 23 and grooves A21 defined in the second end of the second control member 21 when the cover 12 is engaged with the base. A slot 240/250 is defined in a top of each of the power control member 24 and the direction control member 25 so as to receive wires from the adapter 26.

The control members are easily connected with each other by simply inserting flanges in grooves so that the assembly of the switch box is easily.

While we have shown and described various embodiments in accordance with the present invention, it should be clear to those skilled in the art that further embodiments may be made without departing from the scope and spirit present invention.

What is claimed is:

1. A switch box for a ceiling fan, comprising:
   a base having a base board with a peripheral wall extending from said base board, two openings defined in said peripheral wall and two insertions extending from two sides defining each opening;

a first control member having two grooves defined in a first end thereof and said insertions of one of said two openings engaged with said grooves, two grooves defined in a second end of said first control member;

a second control member having two grooves defined in a first end thereof and said insertions of the other opening engaged with said grooves, two grooves defined in a second end of said second control member, and a cover engaged with said peripheral wall of said base and a hole defined through said cover, a control assembly connected to said cover and two ends of said control assembly having flanges which are respectively engaged with said grooves of said second end of said first control member and said grooves in said second end of said second control member.

2. The switch box as claimed in claim 1, wherein said control assembly has a position tube and a bolt extends through said cover and is engaged with said position tube to connect said control assembly to said cover.

3. The switch box as claimed in claim 2, wherein said control assembly comprises an adapter, a power control member connected to an end of said adapter and a direction control member connected to the other end of said adapter, said position tube extending from said adapter and a plurality of protrusions extending from each of two ends of said adapter, each of said power control member and said direction control member having recesses defined therein so as to engage with said protrusions.

4. The switch box as claimed in claim 1 further comprising a chain of beads movably extending from said first end of first control member.

* * * * *